United States Patent
Weiss

[11] 3,804,354
[45] Apr. 16, 1974

[54] FUEL ROD SPACER SYSTEM FOR NUCLEAR FUEL ASSEMBLIES

[75] Inventor: Joseph R. Weiss, Byram, Conn.

[73] Assignee: United Nuclear Corporation, Elmsford, N.Y.

[22] Filed: Mar. 9, 1972

[21] Appl. No.: 233,018

[52] U.S. Cl.............. 248/68 R, 165/162, 176/76, 176/78, 248/54 R
[51] Int. Cl............................................. G21c 3/34
[58] Field of Search............ 248/68 R, 68 CB, 54 R; 176/76, 78; 165/162, 178; 138/108, 112, 113, 114

[56] References Cited
UNITED STATES PATENTS

| 3,281,328 | 10/1966 | Hazel et al...................... 176/76 X |
| 3,646,994 | 3/1972 | Piepers et al................... 165/162 X |
| 2,915,089 | 12/1959 | Horsting........................... 138/113 |

FOREIGN PATENTS OR APPLICATIONS

| 52,016 | 9/1941 | Netherlands....................... 138/64 |

Primary Examiner—Roy D. Frazier
Assistant Examiner—Rodney H. Bonck
Attorney, Agent, or Firm—Pennie & Edmonds

[57] ABSTRACT

An improved nuclear fuel rod spacer system and support structure is disclosed which includes a cage assembly for receiving a fuel rod in tight bearing engagement therewith. A cage assembly with a fuel rod extending therethrough is constructed to fit within a cell defined by a conventional grid structure and to lockingly engage a specially constructed and cooperating locking structure projecting inwardly of the cell.

8 Claims, 11 Drawing Figures

PATENTED APR 16 1974

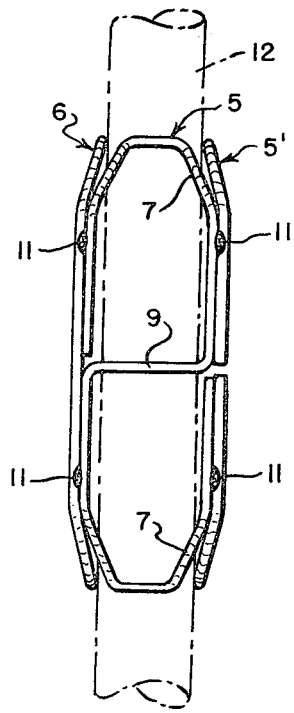
FIG. 6
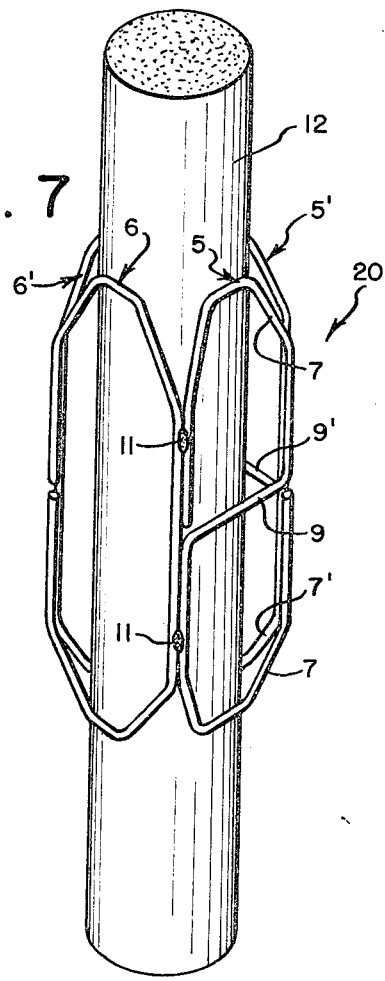
FIG. 7
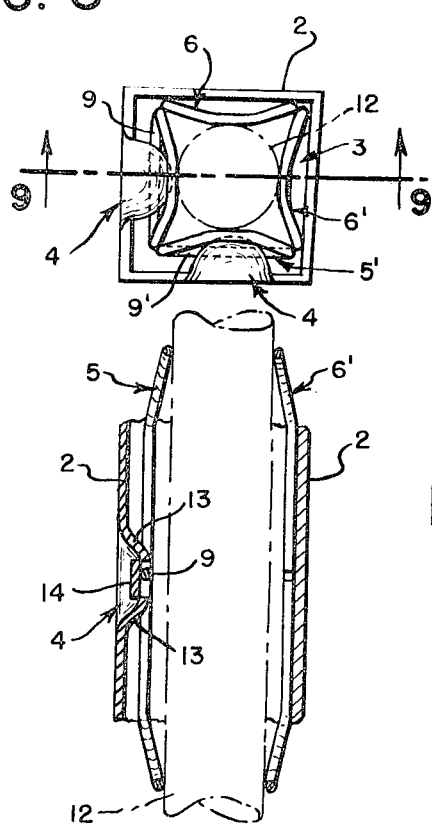
FIG. 8
FIG. 9

FUEL ROD SPACER SYSTEM FOR NUCLEAR FUEL ASSEMBLIES

BACKGROUND OF THE INVENTION

In rod-type nuclear reactor fuel assemblies, a bundle of fuel rods is generally held in spaced relationship to each other by use of a spacer assembly. The spacer assembly generally consists of spacer ribs assembled together in egg crate fashion to form a grid which defines the plurality of individual cells for receiving the fuel rods. The spacer ribs are generally made of zircaloy and the ribs form the structural boundary of each fuel rod cell. Generally several spacer assemblies are utilized with each being positioned at a different level along the fuel rod bundle.

A support structure is associated with each cell for the purpose of holding each rod firmly in position within the cell. With prior constructions, such support structure generally includes a system of spring and fixed point contacts formed in narrow thin strips which are usually made of Inconel. In most instances these Inconel strips are permanently fastened to the spacer ribs which define the grid structure.

The spring and fixed contact points, with prior constructions, have taken a variety of shapes including various assortments of dimples, pimples, buttons and other raised surfaces. There are several drawbacks associated with prior art constructions, the most devastating of which is the tendency of these contact points to scratch the fuel rod upon insertion into the spacer assembly. Also, during reactor operation fuel rods supported by most prior art constructions have a tendency to vibrate thus causing fretting of the rod cladding at the point of contact.

SUMMARY OF THE INVENTION

In accordance with the teachings of the present invention an improved fuel rod support structure for a spacer system is provided and, moreover, one in which damage to the fuel rods both during insertion into the reactor assembly and during operation of the reactor is advantageously eliminated.

In construction the improved support structure includes a cage structure through which the fuel rod extends in tight fitting engagement therewith. One portion of the cage structure, which, in the preferred construction, consists of a locking rung having a smooth round outer surface, extends in a direction generally transverse to the longitudinal axis of the fuel rod when the cage structure is in place about the fuel rod. The support structure also includes a button-like projection formed in the rib of the grid structure. This projection is formed at a point along the rib located within the boundary of the cell and extends inwardly of the cell. The button-like projection is specially constructed to receive the rung of the cage into substantially locking engagement therewith. The construction is such that the fuel rod is held firmly in place in the sense that is is prevented from moving radially within the cell structure. Furthermore, the force of engagement between the cage structure and the fuel rod is greater than the force of engagement between the rung of the cage structure and the button-like projection. With such an arrangement any relative linear movement between the fuel rod and the grid structure during reactor operation occurs at the point of contact between the rung and the interengaging button-like projection rather than between the cage structure and the fuel rod. Thus any movement between the cage structure and the fuel rod which might lead to scratching or fretting of the fuel rod cladding is advantageously prevented.

BRIEF DESCRIPTION OF THE DRAWINGS

FIG. 6 is a plan view of the assembled cage with a fuel rod extending therethrough.

FIG. 7 is a perspective view of the assembled cage structure with fuel rod extending therethrough.

FIG. 8 is a top plan view of the support structure of the present invention in its functional position within a cell of the grid structure, and FIG. 9 is a cross-sectional view of the support structure of the present invention taken along the lines 9—9 of FIG. 8.

DETAILED DESCRIPTION OF THE INVENTION

Figure 1:
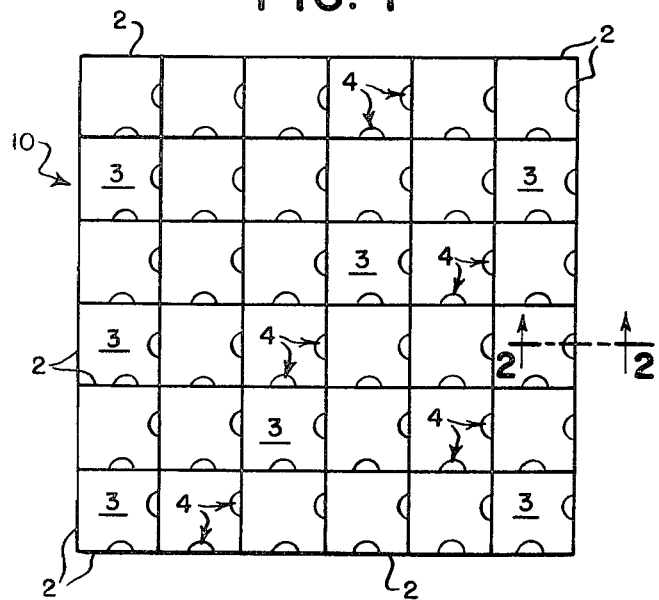
FIG. 1 is a top plan view of a grid structure incorporating the support structure of the present invention.

With reference to FIG. 1, there is shown a conventional grid structure, indicated generally by reference numeral 10. The grid structure 10 includes a plurality of ribs 2 which are arranged perpendicularly to each other to form a plurality of fuel rod receiving cells 3. Spacer ribs 2 are preferably made of a low neutron absorbing material such as zircaloy.

Each cell 3 includes at least one button-like projection 4 formed in the surface of rib 2. The button-like projections 4 extend inwardly of the cell and, in the construction shown in the drawings, each cell contains two button-like projections 4 formed in the ribs which define adjacent boundary walls of each cell. In the interest of clarity of description the button-like projections 4 of the support structure will be described more fully hereinafter.

The cage structure of the support structure of the present invention is indicated generally by reference numeral 20 in FIG. 7. As shown, the cage structure 20 consists of gripping members 5 and 6, with two gripping members 5 and two gripping members 6 being required to complete the cage structure 20 shown. In the construction shown, members 5 and 6 are made of spring material such as Inconel wire of small round cross-sectional area although other cross-sectional configurations can be used such as square or oval. Inconel round wire is advantageous for use in the present invention due to its strength and ease in forming. Also round wire provides a smooth surface free from sharp edges in all directions the purpose of which will be described more fully hereinafter. In addition, with its small cross-section area and round shape, the Inconel wire of the preferred embodiment presents minimal interference to the flow of reactor collant past the rod assembly during reactor operation.

Figure 4:
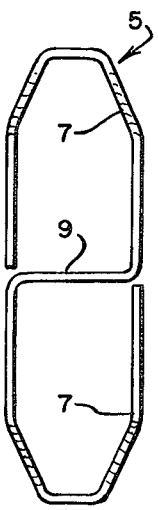
FIG. 4 is a plan view of one part of the cage structure of the support structure disclosed by the present invention.
Figure 4A:
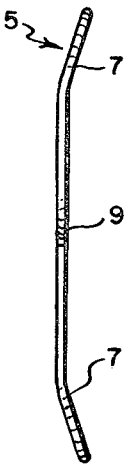
FIG. 4A is a side elevational view of the cage structure part shown in FIG. 4.

To form gripping member 5, a suitable length of round wire is bent by any suitable technique into the configuration shown in FIG. 4. It will be seen that gripping member 5 defines a generally planar closed-S configuration such that the curved loop sections 7 of the S are interconnected by a generally horizontal disposed rung member 9. The end portions of loop sections are bent away from the plane defined by the rung member 9 so that both end portions extend in the same direction. In other words, the planes defined by the end sections intersect the plane defined by the rung member.

Figure 5:
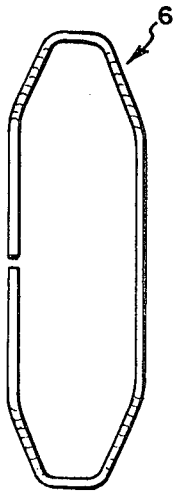
FIG. 5 is a plan view of another part of the cage structure of the support structure disclosed by the present invention.
Figure 5A:
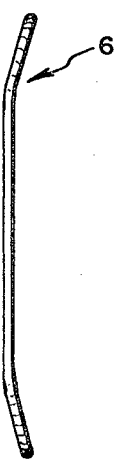
FIG. 5A is a side elevation view of the part of the cage structure shown in FIG. 5.
Figure 3:
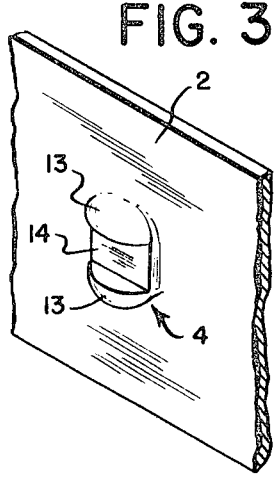
FIG. 3 is a perspective view of the button-like projections of the support structure disclosed in the present invention.

The gripping member 6 of the cage is formed in a manner similar to gripping member 5 by bending a suitable length of wire into the configuration shown in FIG. 5 which is generally oval in shape. As with gripping member 5, the outermost end portions of the oval shaped member 6 are bent and these bent end portions extend generally in the same direction with respect to the original plane defined by gripping member 6 before bending.

Figure 2:
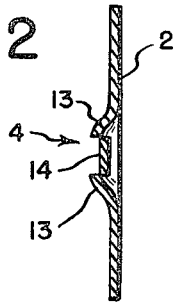
FIG. 2 is a cross-sectional view taken along lines 2—2 of FIG. 1.

With reference now to FIG. 2 it will be seen that each button-like projections 4 includes two raised breakthrough buttons 13 which are interconnected by a raised flat locking surface 14. The locking surface 14 is raised in the sense that it lies in a plane spaced above the plane defined by its associated rib. The length of the locking surface 14 is defined by the spacing between buttons 13 and its lengthwise dimension is selected to account for any anticipated linear movement of the fuel rod during reactor operation and to allow for various tolerance build-ups during manufacture.

The gripping members 5 and 6 described above are assembled into the cage structure shown in FIGS. 6 and 7. In the construction shown, gripping members 5 are positioned opposite gripping members 6 and the four gripping members 5,5' and 6,6' are spot welded together at points 11.

A nuclear fuel rod 12 extending through the cage 20 is gripped tightly by the bent end sections of the four gripping members. In order to position the cage around the fuel rod the cage is simply sprung open and slid over the fuel rod and then moved longitudinally along the rod to a predetermined position and released. Upon release the bent end sections of the gripping members will hold the fuel rod in tight fitting relationship. Due to the round surface of the fuel rod and the round surface of the gripping members point contact will be advantageously established along the various contact areas between the cage 20 and fuel rod 12. The cage grips the fuel rod relatively tightly in the sense that the force of engagement between the cage 20 and fuel rod 12 is greater than the force of engagement between the rung members 9 and the button-like projections 4 all of which will become abundantly clear upon reference to the following portion of the specification which describes the inter-relationship between the cage 20 and the button-like projections 4.

With reference to FIGS. 8 and 9 it will be seen that the rung member 9 of gripping member 5 engages the button-like projections 4 along the locking surface 14. The cage is moved into locking engagement with the button-like projections 4 simply by sliding the fuel rod and cage longitudinally through aligned cells in succeeding spacer assemblies with the rungs positioned opposite the button-like projections 4. To lock the cage structure in place the cage is rotated 180° and pushed into the cell in the appropriate spacer assembly until the rungs of the gripping members 5 snap over dimples 13 into locking engagement on the locking surfaces 14 of the button-like projections. The cage 20 may be held during this procedure to prevent slippage between the cage and the fuel rod during insertion into the cell.

The cage lockingly engages the raised button-like projections 4 in the sense that radial movement of the fuel rod within the boundary structure of the cell is prevented. As mentioned above, however, axial or linear movement of the fuel rod during reactor operation is permitted. It is to be particularly noted that the force of engagement between the rungs 9 of gripping members 5 and the locking surface 14 of the button-like projections 4 is less than the force of engagement between the cage 20 and the fuel rod. With this arrangement any linear movement of the fuel rod occurring during reactor operation will occur between the cage and the locking surface 14. As mentioned above the lengthwise dimension of locking surface 14 is selected to allow for whatever linear movement of the fuel rod is anticipated.

With the support structure for nuclear fuel rods constructed according to the present invention several advantages are provided over heretofore known constructions. First of all the possibility of scratching or otherwise injuring the cladding of the fuel rod is substantially eliminated. This is due to the fact that relative movement between the fuel rod and the cage is highly unlikely and even if such movement should occur the smooth round surface of the wire forming cage 20 is unlikely to cause significant scratching or damage to the cladding.

The small cross-sectional area of the wire forming the cage and its round shape provide minimal interference to the flow of reactor coolant. Flow of reactor coolant is further aided by the open-mesh construction of the cage.

In addition, the support structure disclosed herein is simple in construction, easy and economical to manufacture, and provides ease in inserting and locking the fuel rods into the spacer assemblies. The structure disclosed herein is also adaptable for any size fuel rod assembly or for a grid structure containing an odd or even number of rows in the fuel rod array.

While the construction shown in the drawings utilizes two gripping members 5 and two gripping members 6 to form the cage, other arrangements are also conceivable. For example, the cage could be constructed of four gripping members 5 in which case the corresponding cell of the grid structure would be equipped with four mating button-like projections. It is also conceivable that the gripping members 5,5' could be positioned opposite each other instead of opposite gripping members 6,6', as shown. Furthermore, while the gripping members 5 and 6 of the preferred embodiment are made of spring material to provide resiliency it is also conceivable that one or more of those members may be constructed of rigid material to provide fixed point contact for the fuel rod. And, modifications other than those specifically suggested will be readily apparent to those skilled in the art.

I claim:

1. In a nuclear fuel rod spacer assembly having a grid structure defining a plurality of fuel rod receiving cells and a support structure associated with each cell and adapted for supporting a portion of the fuel rod extending therethrough, the improvement wherein at least one support structure includes:
   a. a cage structure dimensioned and configured to be engageably supported within the cell of the grid structure and surrounding at least a portion of the fuel rod, said cage structure being dimensioned and configured to securely engage the rod in substantially tight fitting relation therewith such that the longitudinal axis of the rod is substantially central of said cage structure;
   b. at least resilient one member secured to said cage structure and extending in a direction generally transverse to the longitudinal axis of the fuel rod; and
   c. at least one button-like projection extending from an inner surface portion of the cell and inwardly toward the central portion thereof, said projection having means thereon engageable by the transverse member of said cage structure in snapped engagement therewith while the dimensions and configuration of the cage structure provide engagement with cell portions opposite said button-like projection thereby supporting the rod within the cell.

2. The improvement according to claim 1 wherein:
   a. said one resilient member is a rung member extending in a direction generally transverse to the axis of the fuel rod, and
   b. the button-like projection includes two buttons spaced apart by a flat surface for engaging said rung-like member.

3. The improvement according to claim 2 wherein said flat surface is raised.

4. The improvement according to claim 2 wherein:
   a. said cage includes at least one gripping member made of a continuous length of wire bent to form an open-mesh structure with said rung-like member being defined by a section of the bent wire.

5. The improvement according to claim 2 wherein:
   a. said cage includes four gripping members each of which is made of a continuous length of wire bent to form an open-mesh structure with at least two of said gripping members each having at least one of said rung-like members with each such rung-like member being defined by a section of the bent wire.

6. The improvement according to claim 5 wherein:
   a. the gripping members with the rung-like members are positioned adjacent each other.

7. The improvement according to claim 4 wherein:
   a. each gripping member has opposing end portions extending in the same direction away from the plane defined by each rung-like member.

8. The improvement according to claim 7 wherein:
   a. each of said gripping members are made of spring wire of generally round cross-sectional configuration.

* * * * *

UNITED STATES PATENT OFFICE
CERTIFICATE OF CORRECTION

Patent No. 3,804,354　　　　　　　　Dated April 16, 1974

Inventor(s) Joseph R. Weiss

It is certified that error appears in the above-identified patent and that said Letters Patent are hereby corrected as shown below:

1. In column 1, line 59, "is is" should read --it is--.

2. In column 3, line 2, "collant" should read --coolant--.

3. In claim 1, column 5, line 15, "resilient one" should read --one resilient--.

Signed and sealed this 1st day of October 1974.

(SEAL)
Attest:

McCOY M. GIBSON JR.　　　　　　　　C. MARSHALL DANN
Attesting Officer　　　　　　　　　Commissioner of Patents